Aug. 18, 1970  J. L. LA FLEUR  3,524,517
AIR SUPPORTED VEHICLE UNDERCARRIAGE
Filed May 29, 1968  4 Sheets-Sheet 1

INVENTOR.
JEAN L. LaFLEUR
BY
Bean & Bean
ATTORNEYS

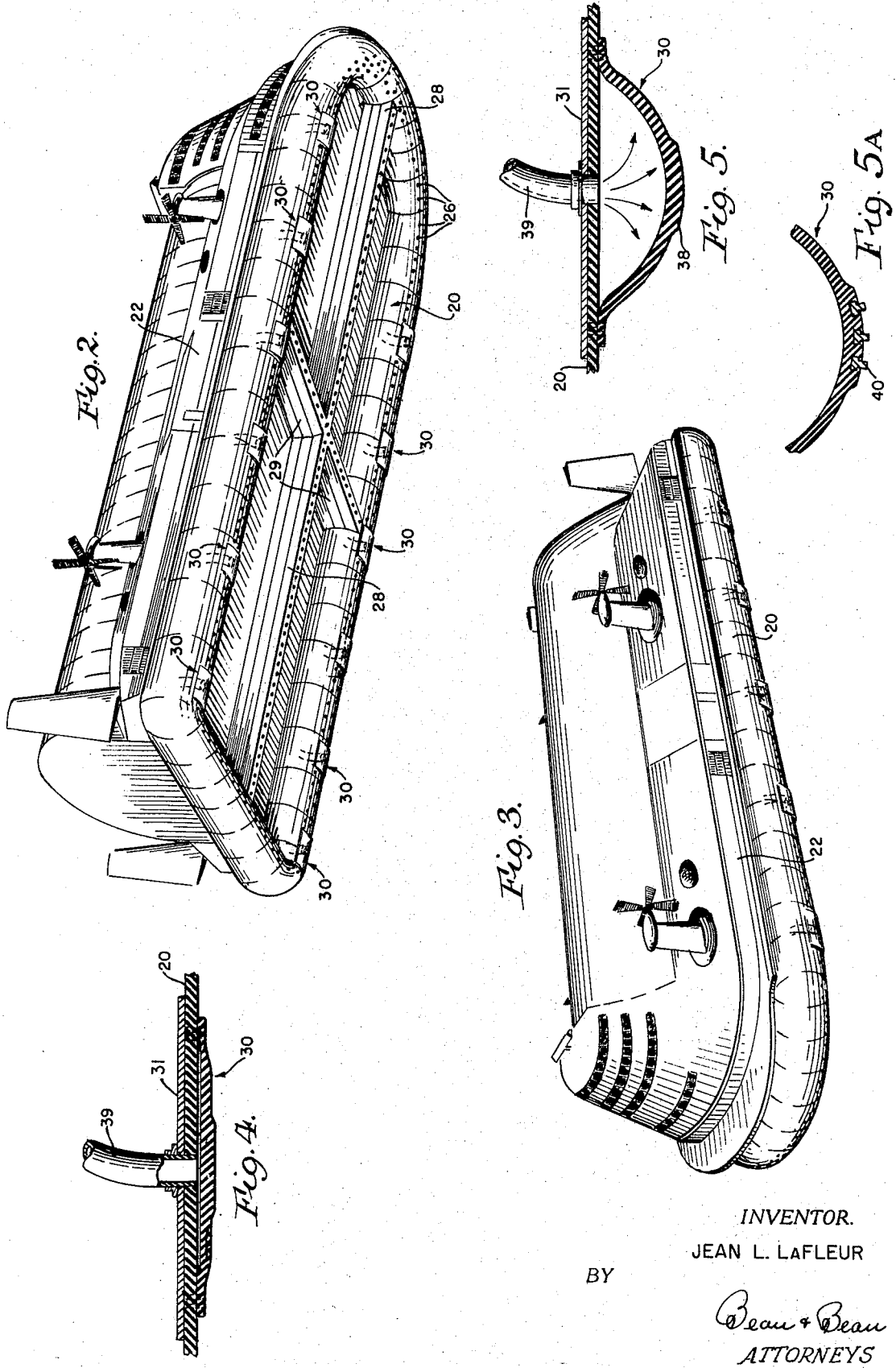

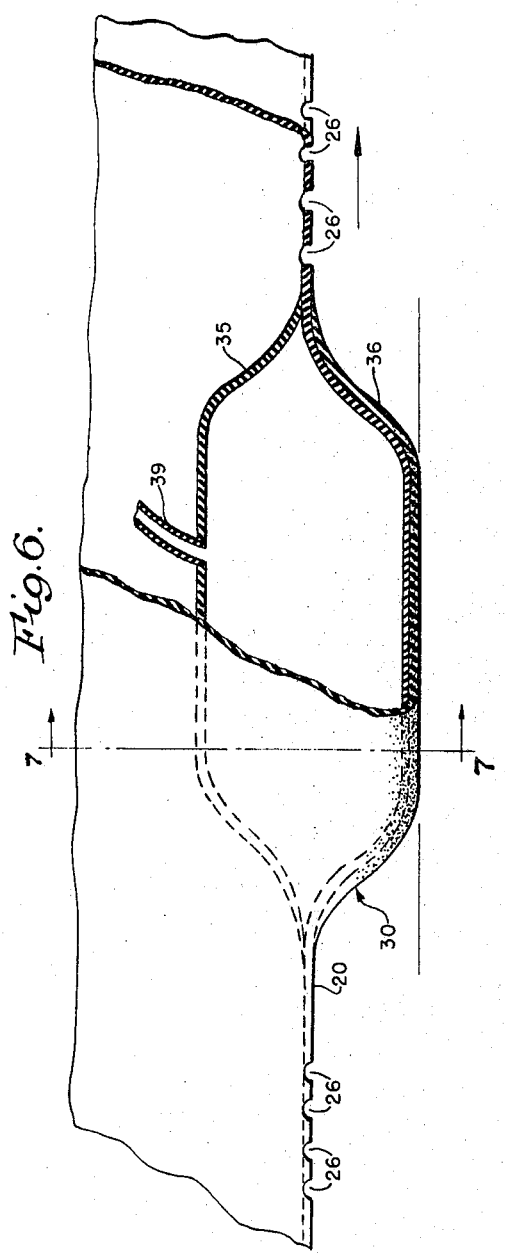
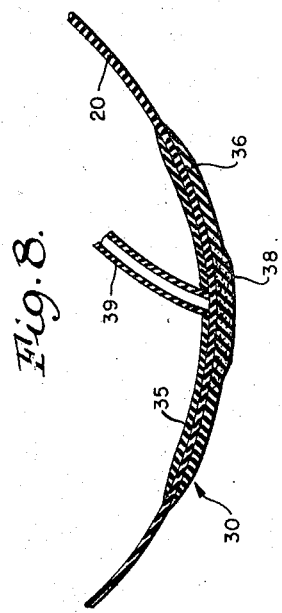
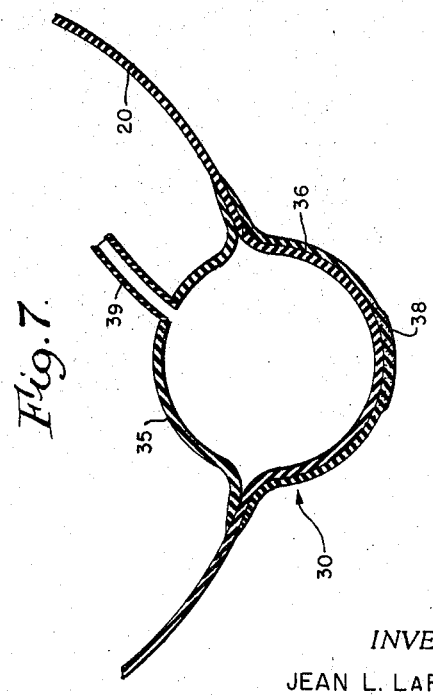

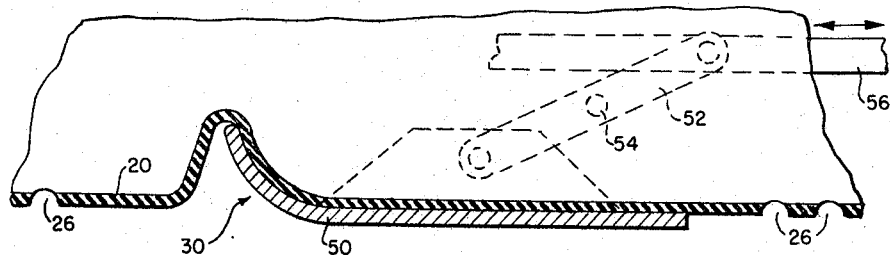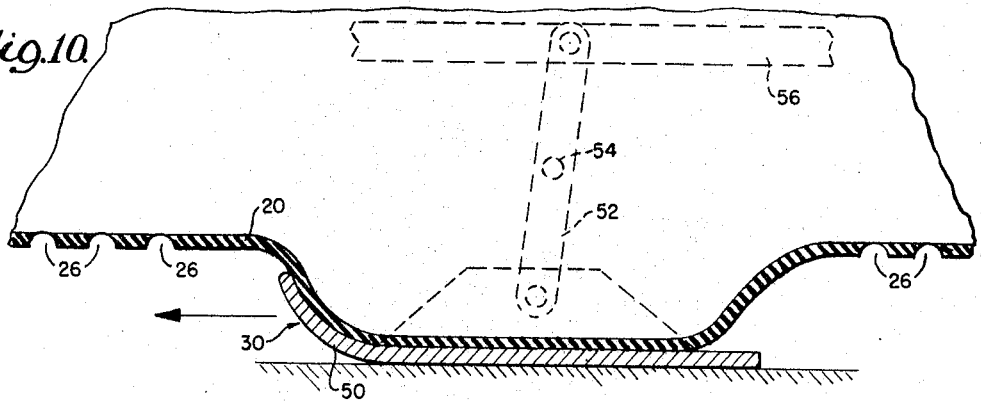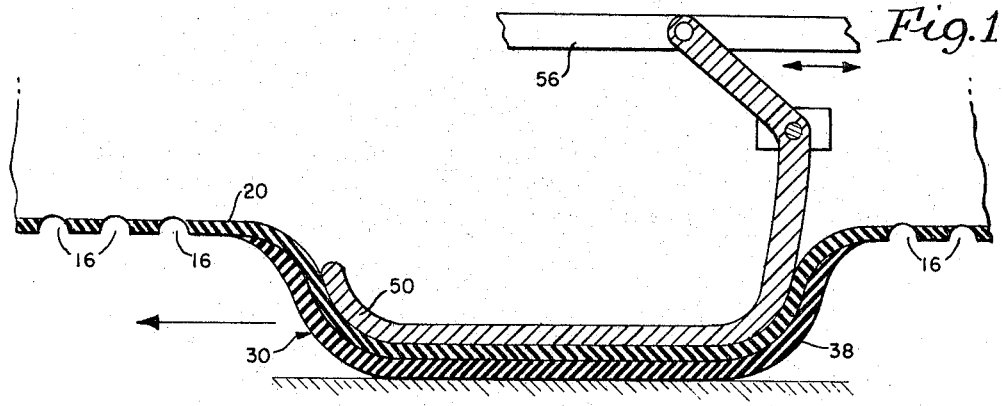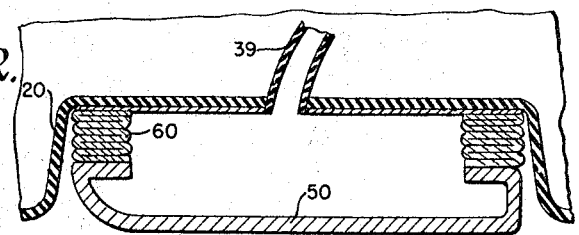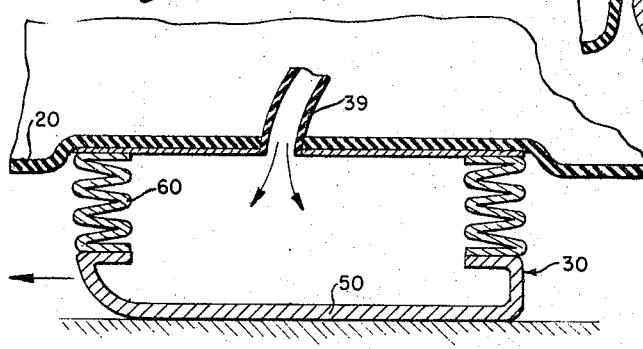
INVENTOR.
JEAN L. LaFLEUR

United States Patent Office 3,524,517
Patented Aug. 18, 1970

3,524,517
AIR SUPPORTED VEHICLE UNDERCARRIAGE
Jean L. La Fleur, Chippawa, Ontario, Canada, assignor to Bell Aerospace Corporation, Wheatfield, N.Y.
Filed May 29, 1968, Ser. No. 733,067
Int. Cl. B60v 1/16
U.S. Cl. 180—124         8 Claims

ABSTRACT OF THE DISCLOSURE

An undercarriage for aircraft and/or ground effect machines comprising a ground contacting braking and/or maneuvering control device for such vehicles including, in conjunction with an air-inflated envelope type air cushion confining arrangement, a series of extendible pads disposed in spaced relation and defining portions of the footprint areas of the envelope device and adapted upon inflation to extend downwardly beyond the bottom contour of the footprint area of the envelope device. The pad extension retraction operations are under control of the vehicle pilot, whereby the lift effects of the air cushion under the vehicle at opposite sides of the vehicle yaw axis may be regulated selectively by the pilot for vehicle braking and/or maneuvering purposes. The pads are preferably surfaced with wear resistant material and drag on the ground when extended, thereby contributive to the braking action.

DETAILED DESCRIPTION OF THE INVENTION

The invention relates to an improvement in inflated-trunk or envelope type cell arrangements in air cushion supported vehicles; such as shown for example in U.S. Pat. 3,275,270; the improvement comprising inclusion at intervals along the footprint area of the trunk system, a plurality of downwardly projectible pad-like formations. When the pads are projected downwardly from the main trunk structure they elevate it relative to the reaction surface, thereby increasing the effective cushion air escape gap and consequently reduce the air cushion lift effects. At the same time the pads contacting the reaction surface provide drag-braking effects against travel motions of the craft. The invention also contemplates that the pads at opposite sides of the vehicle may be differentially controlled by the vehicle operator to provide an improved vehicle guidance technique. By way of example the invention is illustrated herein by the accompanying drawing, wherein:

THE DRAWING

FIG. 2 is a side-bottom perspective view of a "ground effect" or air cushion supported type vehicle embodying the present invention;

FIG. 3 is a top perspective view of the vehicle of FIG. 2;

FIG. 4 is a fragmentary sectional view on enlarged scale, taken as suggested by line 4—4 of FIG. 1 and showing one of the pad devices of the present invention in deflated, non-operative condition;

FIG. 5 is a view corresponding to FIG. 4 but showing the device thereof in pad-inflated and vehicle braking condition;

Figure 1:
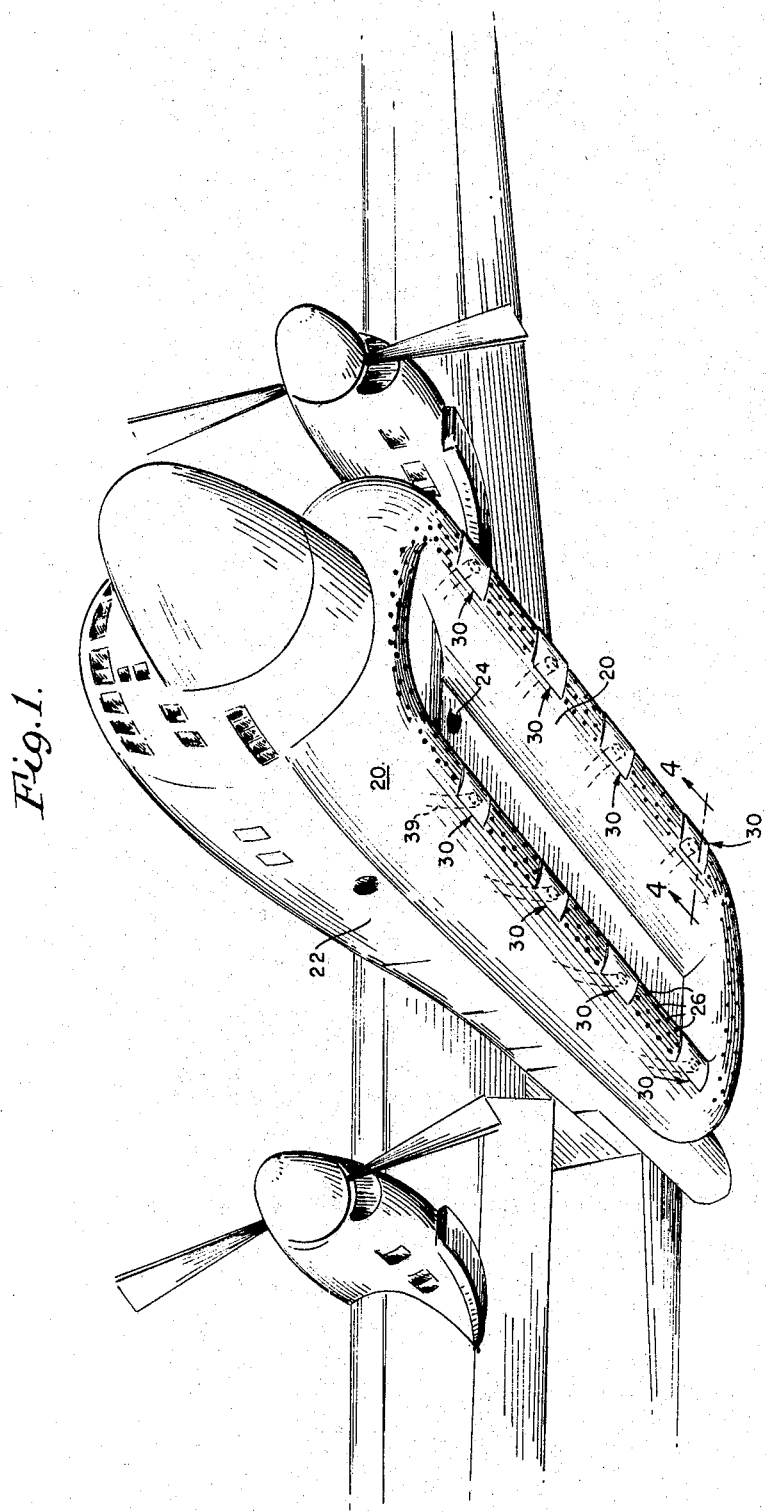
FIG. 1 is a front-bottom perspective view of an airplane, having an undercarriage of the air cushion confining trunk type embodying the present invention.

FIG. 5A corresponds to a portion of FIG. 5 but shows the inclusion of skid-reducing devices in the ground-contact area of the pad;

FIG. 6 is an enlarged scale fragmentary side elevational view of the undercarriage trunk and of one of the pad devices of the invention in operative condition; with portions broken away to further illustrate portions of the construction in vertical section;

FIG. 7 is a fragmentary transverse sectional view taken as suggested by line 7—7 of FIG. 6;

FIG. 8 is a view corresponding to FIG. 7 but illustrating the device when in deflated, non-braking condition;

FIG. 9 is a fragmentary view corresponding to FIG. 4 but illustrating a modified form of pad construction and actuating device, in inoperative position;

FIG. 10 corresponds to FIG. 9 but illustrates the mechanism thereof in operative condition;

FIG. 11 corresponds to FIG. 10 but illustrates another form of pad actuating mechanism; and FIGS. 12 and 13 correspond to FIGS. 9 and 10 but illustrate still another form of pad construction and actuating mechansm, in inoperative and operative positions, respectively.

DETAILED DESCRIPTION

As illustrated by way of example in the drawing herewith at FIG. 1, the invention may be employed in conjunction with the undercarriage structure of an airplane, of the type disclosed in U.S. Pat. 3,275,270. Or, as illustrated at FIGS. 2, 3, the invention may be employed in conjunction with the air cushion support system of a so-called "ground effect machine" or "air cushion supported vehicle." In either case, the invention is incorporated in an air-inflatable trunk system 20 which constitutes a flexible barrier device depending from the rigid hull structure 22 of the machine to define thereunder an air cushion confining space such as may be supplied with compressed air through an outlet as indicated at 24 (FIG. 1), as is well known in the art.

It is also well known that the operational capabilities of such machines may be facilitated by the provision of bleed-off apertures such as shown at 26 through the trunk fabric along the footprint areas thereof; and that in the case of the ground effect machine arrangement as shown in FIGS. 2, 3, enhancing of the vehicle operational capabilities may be attained through use of an air cushion subdividing device. Thus as shown in the drawing herewith, such device may comprise a cooperative arrangement of both longitudinally and transversely extending partitions 28, 29 (FIG. 2) which operate to prevent upsetting of the machine.

In either case the present invention contemplates that the footprint areas of the inflatable trunk device are provided at intervals therealong with supplemental extendible pad devices such as are shown at 30. These pad devices may be externally affixed to the basic trunk structure and provided with a rigid back-up plate 31 as illustrated at FIGS. 4, 5; or alternatively, they may be provided by stitching and/or cementing of a flexible skin member 35 to the inner surface of the trunk structure at intervals therealong. In such case a tear and wear-resistant flexible sheet member 36 having a friction-sacrificial material tread portion 38 at the bottom surface thereof is preferably fixed to the outside surface of the trunk, as illustrated at FIGS. 6–8. Also, as shown at FIG. 5A the friction tread portions 38 may be constructed to include metallic anti-skid studs such as shown at 40.

The pads 30 may be fabricated of any suitable strength elastic air-impervious sheet material, such as a nylon reinforced neoprene composition having an elastic quality of the order of 200%. Whereas the normal operative air pressure inside the main trunk structure 20 may for all practical purposes be of the order of say 1 p.s.i., in accordance with the present invention the pads 30 may be inflated to extend into their operative positions by means of a supply of compressed air introduced at pressures of the order of 4 p.s.i., such as may be supplied through conduits 39. The pads 30, when inflated in response to vehicle-operator actuation of a control device (not shown) extend downwardly as illustrated at FIGS. 5, 6, 7, and drag on the ground surface. However, the system of the present invention does not simply depend upon the friction-braking effects thereby attained, but more importantly relies upon the air cushion lift reduction resulting from the momentary uplift of the main trunk footprint areas, whereby the size of the cushion air escape gap thereunder is increased. Hence, the vehicle immediately loses "lift effect" relative to the reaction surface at those portions of the footprint area of the trunk system that have been elevated as a result of extension of the pad devices 30. The pad control system may be arranged to permit the pilot to selectively inflate the pad devices differentially for maneuvering control of the vericle.

Therefore, if the vehicle operator simply opens the pad control valve system so as to simultaneously inflate all of the pads 30 downwardly, the vehicle will be thereby levitated so as to enlarge the effective cushion air escape gap, with consequent reduction of the vehicle lift effect. This results in an immediate braking of the vehicle's forward motion. However, if differential inflations of the pads 30 are applied at opposite sides of the maneuvering control axis of the vehicle, the operator will be thereby enabled to perform the desired maneuvering control of the vehicle incidental to landing, taxiing, docking and/or take-off procedures. The decreased lift effect resulting from inflation of the pads 30 is not only responsive to temporary levitation of the trunk system and increase of the air escape gap, but is also due in large measure to disruption of the previously extant air lubricant effect caused by normal escape of cushion air from beneath the vehicle. This is an important feature of the present invention.

FIGS. 9, 10, illustrate a modified form of extensible braking pad arrangement of the invention, wherein the trunk member 20 is provided at intervals along its fore and aft footprint areas with ski-shaped wear-resistant shoe devices 50 externally thereof; said shoes being swingably mounted relative to the machine structure by means of rocker arms 52 pivotally mounted as indicated at 54 and operatively actuated as by means of a push-pull strut 56. Thus it will be seen that actuation of the struct 56 will alternatively extend-retract the shoe 50 relative to is "stowed away" position as shown in FIG. 9, and relative to its extended, vehicle braking position, as shown in FIG. 10.

FIG. 11 illustrates another modified form of the invention wherein the shoe device 50 is disposed interiorly of the trunk 20 and is adapted to be alternately actuated to provide corresponding extension-retraction motions of spaced apart pad portions 30 of the trunk structure. In the case, the trunk material is wear-resistant reinforced at the pad areas thereof as indicated at 38. FIGS. 12, 13 illustrate still another modification of the braking pad structure of the present invention wherein the braking shoe device 50 is carried externally of the trunk structure 20 by means of a bellows device as indicated a 60. A high pressure air inlet conduit 39 as employed in conjunction with the configurations of FIGS. 4, 5–8 may be employed to activate the bellows 60, so as to alternately extend and retract the shoe device 50 between retracted and extended braking position, as illustrated at FIGS. 12, 13, respectively.

It will of course be understood that although only a few forms of the invention have been illustrated and described in detail herein, various changes may be made therein without departing from the spirit of the invention or the scope of the following claims.

I claim:
1. In an air cushion supported vehicle, in combination a rigid body having a low surface,
a flexible, bag-like trunk device carried by said lower surface of the body,
means for maintaining the interior of said trunk device under superatmospheric air pressure to balloon it downwardly below said lower surface of the body, said trunk device when inflated having a lower peripheral edge circumscribing an air cushion space bounded by said trunk device,
means for supplying said air cushion space with air at a rate sufficient to elevate said lower peripheral edge of the trunk device to create a normal cushion air escape gap between said lower peripheral edge of the trunk device and a reaction surface,
said trunk device including a plurality of brake means formed on and peripherally spaced along said lower peripheral edge of the trunk device for engaging the reaction surface and raising at least portions of said lower peripheral edge of the trunk device to increase said normal cushion air escape gap, thereby to decrease the lift effect of said trunk device by increasing said normal air escape gap and to disrupt the air lubricant effect caused by normal escape of cushion air through said normal air escape gap, and means under pilot control for operating said brake means.

2. In an air cushion supported vehicle as defined in claim 1, wherein said brake means comprises a plurality of normally collapsed bladders formed on and peripherally spaced along said lower peripheral edge of the trunk device, and means for inflating said bladders under pressure greater than that maintained in the interior of said trunk device.

3. In an air cushion supported vehicle as defined in claim 2, wherein the ground-engaging surface of each bladder is formed of a friction-sacrificial material.

4. In an air cushion supported vehicle as defined in claim 3, wherein said lower peripheral edge of the trunk device between said bladders is provided with lubricating air dispensing jets therealong.

5. In an air cushion supported vehicle as defined in claim 2, wherein said lower peripheral edge of the trunk device between said brake means is provided with lubricating air dispensing jets therealong.

6. In an air cushion supported vehicle as defined in claim 1, wherein said lower peripheral edge of the trunk device between said bladders is provided with lubricating air dispensing jets therealong.

7. In an air cushion supported vehicle as defined in claim 1, wherein said brake means comprises a plurality of shoes disposed along said lower peripheral edge of the trunk device, and said means under pilot control including means for depressing said shoes to deform local portions of said trunk device downwardly.

8. The method of controlling an air cushion supported vehicle such as an airplane having a rigid body presenting a lower surface, and a flexible, bag-like trunk device carried by said lower surface of the body, said method comprising the steps of:
maintaining the interior of said trunk device under superatmospheric pressure to balloon it downwardly below said lower surface of the body, said trunk device when inflated having a lower peripheral edge circumscribing an air cushion space bounded by said trunk device,
supplying said air cushion space with air at a rate sufficient to elevate said lower peripheral edge of the trunk device to create a cushion air escape gap between said lower peripheral edge of the trunk device and a reaction surface, and
simultaneously decreasing the lift effect of the trunk device and frictionally braking the vehicle by deforming peripherally spaced local portions only of said trunk device downwardly into frictional engagement with the reaction surface while the lower peripheral edge of the trunk device is elevated as aforesaid whereby not only frictionally to engage said local portions with the reaction surface but also to decrease the lift effect by increasing the size of said air escape gap and disrupt the normal air lubricant effect caused by escape of cushion air through said gap.

References Cited

UNITED STATES PATENTS

| | | | |
|---|---|---|---|
| 3,272,272 | 9/1966 | Hall et al. | 180—128 X |
| 3,275,270 | 9/1966 | Earl et al. | 180—116 X |
| 3,291,236 | 12/1966 | Foshag et al. | 180—129 X |
| 3,294,188 | 12/1966 | Hardy | 180—127 |
| 3,414,077 | 12/1968 | Earl | 180—128 |

FOREIGN PATENTS 1,466,443  12/1966  France.

A. HARRY LEVY, Primary Examiner

U.S. Cl. X.R.

180—119